(12) United States Patent
Winkler et al.

(10) Patent No.: US 9,108,279 B2
(45) Date of Patent: Aug. 18, 2015

(54) METHOD OF ASSEMBLING A PART

(75) Inventors: Yves Winkler, Schmitten (CH); Stewes Bourban, Cudrefin (CH); Alban Dubach, Bienne (CH)

(73) Assignee: The Swatch Group Research and Development Ltd, Marin (CH)

( * ) Notice: Subject to any disclaimer, the term of this patent is extended or adjusted under 35 U.S.C. 154(b) by 289 days.

(21) Appl. No.: 13/703,519

(22) PCT Filed: Jun. 22, 2011

(86) PCT No.: PCT/EP2011/060514
§ 371 (c)(1),
(2), (4) Date: May 8, 2013

(87) PCT Pub. No.: WO2011/161195
PCT Pub. Date: Dec. 29, 2011

(65) Prior Publication Data
US 2013/0212856 A1   Aug. 22, 2013

(30) Foreign Application Priority Data

Jun. 22, 2010 (CH) .................................... 1019/10

(51) Int. Cl.
| | |
|---|---|
| B23P 11/02 | (2006.01) |
| B23P 19/00 | (2006.01) |
| B21J 1/00 | (2006.01) |
| B21J 5/00 | (2006.01) |
| B21K 25/00 | (2006.01) |
| G04B 19/04 | (2006.01) |

(52) U.S. Cl.
CPC ................ *B23P 19/00* (2013.01); *B21J 1/006* (2013.01); *B21J 5/00* (2013.01); *B21K 25/00* (2013.01); *G04B 19/044* (2013.01); *Y10T 29/49826* (2015.01)

(58) Field of Classification Search
CPC ................... Y10T 29/49865; Y10T 29/49863; Y10T 29/4987; Y10T 29/49885; Y10T 29/4984; F16B 2001/0078; F16B 1/0014; F16B 4/006; F16B 4/008; B21J 1/006; B21J 1/06
USPC ......... 29/447, 446, 450, 458, 434; 403/30, 28
See application file for complete search history.

(56) References Cited

U.S. PATENT DOCUMENTS 5,120,175 A * 6/1992 Arbegast et al. ............... 411/501
5,174,616 A * 12/1992 Hagio et al. ................ 285/381.3
(Continued)

FOREIGN PATENT DOCUMENTS

| EP | 313423 A1 * | 4/1989 | ............... F16B 4/00 |
|---|---|---|---|
| EP | 2 138 323 | 12/2009 | |

(Continued)

OTHER PUBLICATIONS

U.S. Appl. No. 13/701,971, filed Dec. 4, 2012, Winkler, et al.
(Continued)

*Primary Examiner* — Essama Omgba
(74) *Attorney, Agent, or Firm* — Oblon, McClelland, Maier & Neustadt, L.L.P.

(57) ABSTRACT

A method of permanent assembly between at least a first part formed of a first material on the one hand, and at least a second part formed of a second material on the other hand which is configured to confine the first part in the permanent assembly.

20 Claims, 2 Drawing Sheets

(56) References Cited

U.S. PATENT DOCUMENTS

| | | | | |
|---|---|---|---|---|
| 5,687,995 | A * | 11/1997 | Mori et al. | 285/381.2 |
| 5,896,642 | A | 4/1999 | Peker et al. | |
| 6,370,757 | B2 * | 4/2002 | Lee et al. | 29/447 |
| 6,637,110 | B2 * | 10/2003 | Jee | 29/890.031 |
| 7,427,171 | B2 * | 9/2008 | Tokairin et al. | 403/276 |
| 7,770,278 | B2 * | 8/2010 | Davies et al. | 29/447 |
| 7,774,916 | B2 * | 8/2010 | Jee et al. | 29/447 |
| 7,836,564 | B2 * | 11/2010 | Barvosa-Carter et al. | 24/442 |
| 8,096,034 | B2 * | 1/2012 | Barvosa-Carter et al. | 29/419.1 |
| 8,225,478 | B2 * | 7/2012 | Kane | 29/447 |
| 8,230,572 | B2 * | 7/2012 | Davies et al. | 29/447 |
| 8,250,725 | B2 * | 8/2012 | Sigler et al. | 29/447 |
| 8,438,714 | B2 * | 5/2013 | Mankame et al. | 29/447 |
| 8,734,703 | B2 * | 5/2014 | Havens et al. | 264/313 |
| 8,815,145 | B2 * | 8/2014 | Everhart et al. | 264/511 |
| 8,819,912 | B2 * | 9/2014 | Browne et al. | 29/428 |
| 8,864,403 | B2 * | 10/2014 | Mankame et al. | 403/28 |
| 8,899,038 | B2 * | 12/2014 | Apland et al. | 60/528 |
| 8,945,325 | B2 * | 2/2015 | Everhart et al. | 156/165 |
| 2002/0175203 | A1 * | 11/2002 | Jee | 228/131 |
| 2004/0187287 | A1 * | 9/2004 | Davies et al. | 29/447 |
| 2005/0067831 | A1 * | 3/2005 | Tokairin et al. | 285/3 |
| 2008/0060175 | A1 * | 3/2008 | Barvosa-Carter et al. | 24/602 |
| 2008/0236720 | A1 * | 10/2008 | Sigler et al. | 156/73.5 |
| 2010/0293775 | A1 * | 11/2010 | Barvosa-Carter et al. | 29/525 |
| 2010/0299907 | A1 * | 12/2010 | Davies et al. | 29/447 |
| 2011/0103199 | A1 | 5/2011 | Winkler et al. | |
| 2011/0194887 | A1 * | 8/2011 | Mankame et al. | 403/28 |
| 2011/0236580 | A1 | 9/2011 | Winkler et al. | |
| 2012/0017422 | A1 * | 1/2012 | Rule et al. | 29/525.05 |
| 2012/0328472 | A1 * | 12/2012 | Watson et al. | 420/550 |
| 2013/0042461 | A1 * | 2/2013 | Tupper et al. | 29/525.01 |
| 2013/0223918 | A1 * | 8/2013 | Mankame et al. | 403/28 |
| 2014/0026390 | A1 * | 1/2014 | Tupper et al. | 29/447 |
| 2015/0016865 | A1 * | 1/2015 | Moidu | 403/30 |

FOREIGN PATENT DOCUMENTS

| | | | | |
|---|---|---|---|---|
| EP | 2 192 454 | | 6/2010 | |
| GB | 2164114 | A * | 3/1986 | F16B 4/00 |

OTHER PUBLICATIONS

U.S. Appl. No. 13/701,970, filed Dec. 4, 2012, Winkler, et al.
International Search Report Issued Oct. 28, 2011 in PCT/EP11/60514 Filed Jun. 22, 2011.

* cited by examiner

METHOD OF ASSEMBLING A PART

CROSS-REFERENCE TO RELATED APPLICATIONS

This is a National Phase Application in the United States of International Patent Application PCT/EP2011/060514 filed Jun. 22, 2011, which claims priority on Swiss Patent Application No. 01019/10 of Jun. 22, 2010. The entire disclosures of the above patent applications are hereby incorporated by reference.

The present invention concerns a method of permanent assembly between at least a first part formed of a first material, and at least a second part formed of a second material which is intended to confine said first part in said permanent assembly.

The technical field of the invention is the field of fine mechanics. More specifically, the invention concerns the technical field of methods of manufacturing amorphous metal parts.

BACKGROUND OF THE INVENTION

The present invention concerns the assembly of two parts to each other, so as to obtain two parts assembled by clamping or conversely two parts that can move relative to each other.

To achieve a moveable assembly (for example a rotating bearing), it is known to have several manufacturing steps consisting, first of all, in very precisely machining at least three parts to be moveably mounted. Next, at least two of these parts must be assembled by screws, bonding, welding or other means, in order to partly confine the third part which is to remain moveable. Making this moveable assembly requires that the final play between the two parts is sufficient to allow them to be able to move in relation to each other. This play must not be too large, otherwise there is a risk of one part being shifted in relation to the other which is not ideal. It is thus complex and expensive to make this type of assembly.

To make immobile/sealed assemblies, it is possible to form a thread for the assembly or to bond, braze, weld or rivet the parts to each other.

Certain problems may appear. Indeed, sometimes the aforementioned known means cannot be used. Firstly, these methods cannot be used because they are not possible. For example, it is not possible to make a thread in a fragile material without breaking the part.

Secondly, these methods cannot be used because undesirable effects occur, for example the degassing of the adhesive material.

SUMMARY OF THE INVENTION

The invention concerns a method of securing two parts to each other which overcomes the drawbacks of the prior art by enabling a first part to be secured to a second part simply and efficiently, wherein said assembly may be fixed or moveable.

The invention therefore relates to the aforementioned assembly method which is characterized in that it includes the following steps:

selecting as the first material a metal alloy capable of becoming at least partially amorphous, the second material not being a metal alloy capable of becoming at least partially amorphous;

taking the part formed of the second material;

shaping the first part and simultaneously assembling it to the second part, with said first material having undergone, at the latest at the moment of said shaping, a treatment allowing it to become at least partially amorphous, the first part and the second part undergoing a thermal cycle consisting in a temperature increase gradient to ensure at least the expansion of the second part followed by a cooling gradient for shrinking the second part around the first part so as to confine said first part, sizing said at least one second part and said at least one first part, and choosing the thermal expansion coefficient of said second material compared to the thermal expansion coefficient of said first material, in order, as appropriate:

to obtain a permanent assembly with said second part clamped over said first part if the product of said thermal expansion coefficient of said second material and said cooling gradient is higher than the product of said thermal expansion coefficient of said first material and said cooling gradient;

to obtain a permanent assembly with at least a degree of freedom between said second part and said first part if the product of said thermal expansion coefficient of said second material and said cooling gradient is lower than the product of said thermal expansion coefficient of said first material and said cooling gradient.

One advantage of the present invention is allowing the two parts to be very easily secured to each other. Indeed, acting on the expansion coefficients of the materials means that the use of a clamping means or a means of obtaining a play is not required. The play between the two parts or the clamping is directly achieved by the choice of materials and their expansion coefficient. Likewise, it becomes easy to modulate the clamping or play by a specific selection of the materials used.

Advantageous embodiments of this securing method form the subject of the dependent claims.

In a first advantageous embodiment, the method includes the following step:

defining said thermal cycle such that said temperature increase gradient raises the first material, selected to be a metal alloy capable of becoming at least partially amorphous, above its melting temperature causing it to lose, at least locally, any crystalline structure, and such that said cooling gradient brings the first material below its vitreous transition temperature, allowing it to become at least partially amorphous.

In a second advantageous embodiment, the method includes the following steps:

transforming the first material into a preform and subjecting it to a treatment which allows it to become at least partially amorphous;

defining said thermal cycle of said first material transformed into a preform such that the preform is subject to a temperature comprised between its vitreous transition temperature and its crystallisation temperature;

pressing said preform such that said at least one second part confines said at least one first part;

cooling the assembly to allow said first material to keep an at least partially amorphous nature.

In a third advantageous embodiment, the method includes a step including in depositing an intermediate layer on the second part, and a final step including in dissolving said intermediate layer in order to increase the play between the first and second part if the product of said thermal expansion coefficient of said second material and said cooling gradient is less than the product of said thermal expansion coefficient of said first material and said cooling gradient.

In another advantageous embodiment, the method includes a step including in making at least one portion in relief on the second part in order to increase the mechanical adhesion between the first and second part.

In another advantageous embodiment, said at least one portion in relief is achieved by machining.

In another advantageous embodiment, said first material or second material chosen as being a metal alloy capable of becoming at least partially amorphous undergoes a treatment allowing it to become totally amorphous.

One advantage of the present invention is that it is very easy to achieve. Indeed, the method uses amorphous metals which have the particular characteristic of softening while remaining amorphous for a certain period of time within a given temperature range [Tg-Tx] for each alloy (where Tx is the crystallisation temperature and Tg is the vitreous transition temperature) (for example for a $Zr_{41.24}Ti_{13.75}Cu_{12.5}Ni_{10}Be_{22.5}$ alloy: Tg=350° C., Tx=460° C.). It is therefore possible to shape these metals under relatively low stress and at a low temperature thus allowing a simplified process to be used. The use of this type of material also allows the very precise reproduction of fine geometries, since the viscosity of the alloy decreases sharply according to temperature within the temperature range [Tg-Tx] and the alloy thus adopts all the details of the negative form. For example, for a platinum-based material, shaping occurs at around 300° C. for a viscosity of up to $10^3$ Pa·s for a stress of 1 MPa, instead of a viscosity of $10^{12}$ Pa·s at temperature Tg. This means that it is possible to simultaneously make and assemble the parts.

The present invention also concerns a method of permanent assembly between at least a first part, formed of a first material on the one hand, and at least a second part, which is formed of a second material on the other hand, and which is intended to confine said first part in said permanent assembly, characterized in that it includes the following steps:

selecting as said second material a metal alloy capable of becoming at least partially amorphous, the first material not being a metal alloy capable of becoming at least partially amorphous;

c) taking the part formed of said first material;

shaping the second part and simultaneously assembling it to the first part, with said second material having undergone, at the latest at the moment of said shaping, a treatment allowing it to become at least partially amorphous, the second part and the first part undergoing a thermal cycle consisting in a temperature increase gradient to ensure an expansion allowing the first part and the second part to be assembled followed by a cooling gradient for shrinking the second part around the first part so as to confine said first part, sizing said at least one second part and said at least one first part, and choosing the thermal expansion coefficient of said second material compared to the thermal expansion coefficient of said first material, in order, as appropriate:

to obtain a permanent assembly with said second part clamped over said first part if the product of said thermal expansion coefficient of said second material and said cooling gradient is higher than the product of said thermal expansion coefficient of said first material and said cooling gradient;

to obtain a permanent assembly with at least a degree of freedom between said second part and said first part if the product of said thermal expansion coefficient of said second material and said cooling gradient is lower than the product of said thermal expansion coefficient of said first material and said cooling gradient.

BRIEF DESCRIPTION OF THE DRAWINGS

The objects, advantages and features of the assembly method according to the present invention will appear more clearly in the following detailed description of at least one embodiment of the invention, given solely by way of non-limiting example and illustrated by the annexed drawings, in which.

DETAILED DESCRIPTION OF THE INVENTION

The present invention concerns the assembly of a first part 1 and a second part 2. The first part 1 is made of a first material having a thermal expansion coefficient $\alpha_1$ and the second part 2 is made of a second material having a thermal expansion coefficient $\alpha_2$. The second part is arranged to confine the first part 1.

In the present case, the first part 1 is made of an at least partially amorphous material comprising at least one metallic element as an at least partially amorphous metal alloy. However, it is possible to envisage making second part 2 in an at least partially amorphous material comprising at least one metallic element and making first part 1 in any material. Preferably, the first 1 and/or second 2 parts are made of a totally amorphous metal alloy which may be identical or different. Said metallic element could be of the precious type.

The characteristics of the amorphous metal of moveable part 1 are used to assemble second part 2 and first part 1. Indeed the amorphous metal greatly facilitates shaping, allowing parts with complicated shapes to be simply developed with greater precision. This is due to the particular characteristics of amorphous metal which can soften while remaining amorphous for a certain period of time within a given temperature range [Tg-Tx] for each alloy (where Tx is the crystallisation temperature and Tg is the vitreous transition temperature) (for example for a $Zr_{41.24}Ti_{13.75}Cu_{12.5}Ni_{10}Be_{22.5}$ alloy Tg=350° C. and Tx=460° C.) It is therefore possible to shape these metals under relatively low stress and at a low temperature thus allowing a simplified process such as hot forming to be used. The use of this type of material also allows the very precise reproduction of fine geometries, since the viscosity of the alloy decreases sharply according to temperature within the temperature range [Tg-Tx] and the alloy thus adopts all the details of the negative form. For example, for a platinum-based material, shaping occurs at around 300° C. for a viscosity of up to $10^3$ Pa·s for a stress of 1 MPa, instead of a viscosity of $10^{12}$ Pa·s at temperature Tg.

Figure 2:
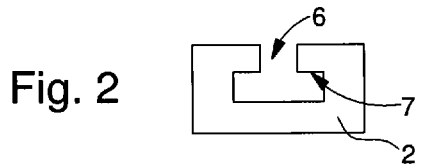
Figure 8:
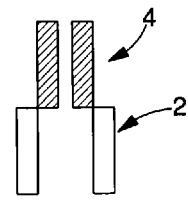

The first step shown in FIG. 2 consists in taking a second part 2, which is used as a support. This support 2 is formed of a material called the "second material" which may be any material. The second part 2 confines first part 1.

Figure 3:

The second step, shown in FIG. 3, consists in taking the first material, i.e. the material forming first part 1. The third step, shown in FIGS. 4 to 6, consists in shaping the first material, which is amorphous metal here, so as to form the first part 1 and so that first part 1 is assembled to second part 2. To achieve this, the hot forming method is used.

First of all, a preform 4 of amorphous material is made. This preform 4 consists of a part whose appearance and dimensions are similar to the final part. Typically, if it is desired to make, for example, a circular membrane, preform 4 will take the form of a disc. An important point is that said preform 4 already has an amorphous structure. To achieve this, the material or materials forming the first material are placed in the liquid state by raising the temperature above their melting temperature. They are then homogeneously mixed to form said first material. This mixture is then cast into dies 5a, 5b of a mould 5 of the desired shape. This is then cooled as quickly as possible so that the atoms do not have time to be structured, the first material then becoming at least partially amorphous.

Figure 4:
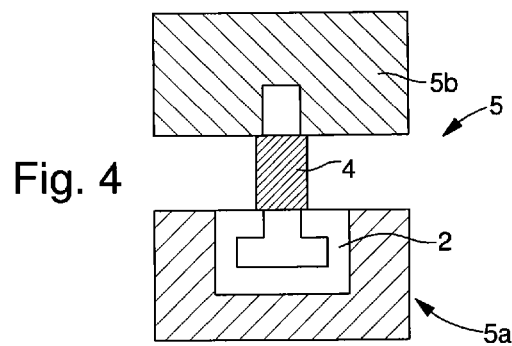
Figure 9:
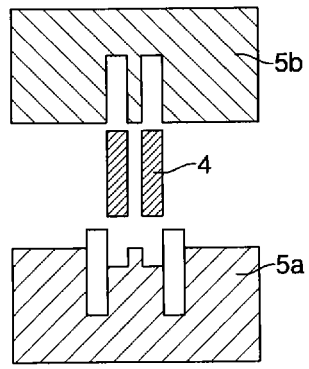

Preform 4 is then arranged on second part 2 so as to cover it, as shown in FIG. 4. The hot press is then heated to a temperature specific to the material, preferably between its vitreous transition temperature Tg and its crystallisation temperature Tx. The first part 1 and second part 2 then undergo an identical increase in temperature. It is possible to envisage this temperature increase being different for second part 2 and for first part 1.

Figure 5:
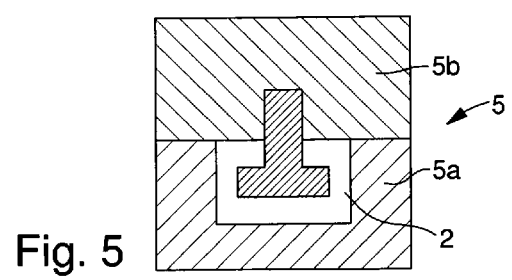
Figure 10:
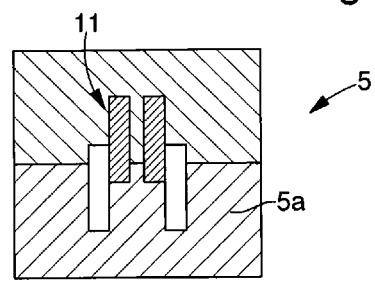

Once the hot press is at temperature, pressure is then exerted on preform 4 to fill the housing 6 in the second part as shown in FIG. 5. This pressing operation is carried out for a predefined time period.

Once the pressing time has passed, the first material is cooled to below Tg to form first part 1. The pressing and cooling must be sufficiently rapid to prevent the first material crystallising. Indeed, for a given first material at a given temperature between its vitreous transition temperature Tg and its crystallisation temperature Tx, there is a maximum duration beyond which said material crystallises. This duration decreases when the temperature gets close to its crystallisation temperature Tx and the duration increases when the temperature gets close to its vitreous transition temperature Tg. Thus, the amorphous material will crystallise if the time spent at a temperature comprised between Tg and Tx exceeds a certain specific value for each temperature/alloy pair. Typically for the Zr41.2Ti13.8Cu12.5Ni10Be22.5 alloy and a temperature of 440° C., the pressing time should not exceed around 120 seconds. Thus, the hot forming preserves the at least partially amorphous initial state of preform 4.

Figure 6:
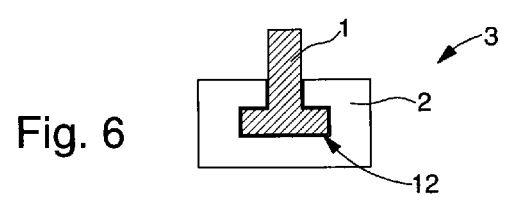
Figure 11:
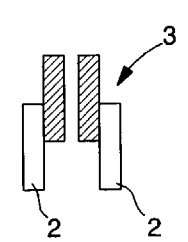
Figure 12:
FIGS. 12 to 18 show schematically a variant of the first embodiment of the method according to the present invention.
Figure 13:
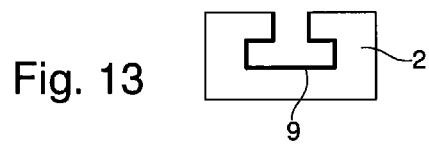
Figure 14:
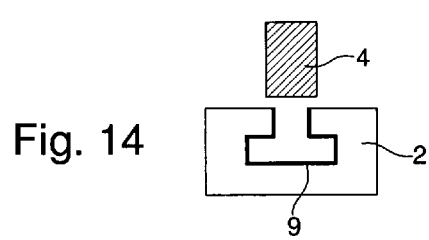
Figure 17:
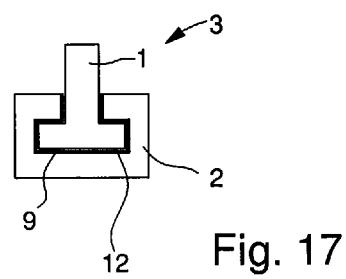
Figure 15:
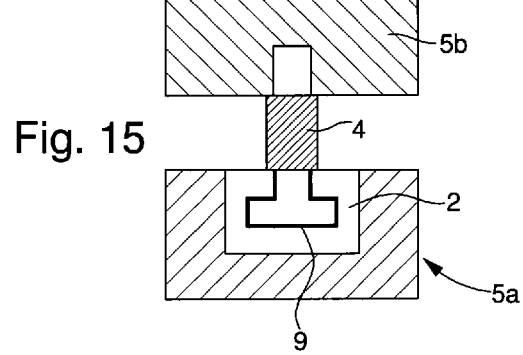
Figure 18:
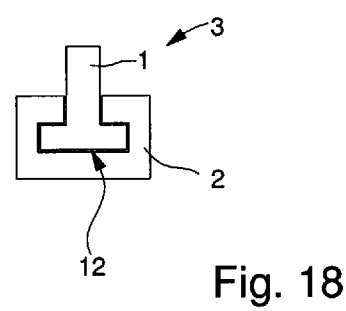
Figure 16:
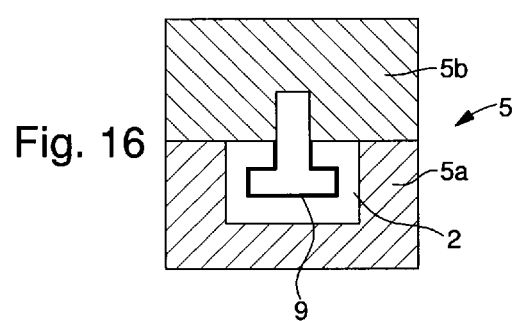

First part 1 and second part 2 are then removed from mould 5 as seen in FIG. 6 to give the final part.

It will be recalled that the second part may be made of amorphous metal and that first part 1 may be made of any material.

A hot forming variant uses the principle of casting. The amorphous metal components are mixed in liquid form, i.e. at a temperature at least equal to the melting temperature. This mixture is then cast in a mould having the shape of the part to be made and then cooled rapidly so that the atoms do not have time to be structured.

Advantageously according to the invention, the first and second materials are selected so that the thermal expansion coefficient $\alpha_1$ is different from the thermal expansion coefficient $\alpha_2$. The thermal expansion coefficient of a material determines the expansion that the material will undergo when its temperature is increased according to the following formula $\Delta L = \alpha \cdot L_0 \cdot \Delta T$ with:

$\Delta L$, the variation in length in meters (m);
$\alpha$, the linear expansion coefficient in kelvin to the power minus one ($K^{-1}$);
$L_0$, the initial length in meters (m);
$\Delta T = T - T_0$, the variation in temperature in kelvin (K) or degrees Celsius (° C.).

This means for example that for a 30 m steel bar, since steel has a thermal expansion coefficient of $12.0 \times 10^{-6}$ being subject to a positive $\Delta T$ of 60° C., the bar will expand to achieve a length of 30.0216 m. Hence, when the temperature decreases, the bar will contract and return to its initial length.

This principle is used in the case of the invention. Indeed, the hot forming is performed at a higher temperature than ambient temperature meaning that the materials forming the first part 1 and second part 2 expand since they undergo a temperature increase gradient. During cooling, i.e. during a cooling gradient, the first and second materials will contract. In the case of hot forming, the gradient is identical since the first and second parts are both placed between the same dies 5a and 5b. If the thermal expansion coefficients are different, the contractions will be different. Naturally, if first part 1 and second part 2 have not experienced the same temperature increase, the gradient will be different for the two parts and the degree of contraction will also be different, since the contraction depends on the temperature increase gradient, the thermal expansion coefficient and the dimensions.

In the case of casting, the fact of pouring said melted alloy into the mould causes the increase in temperature of the second part 2 located in said mould 5. It may then be considered that the temperature of the two materials will be close to each other by thermal transfer.

Figure 1:
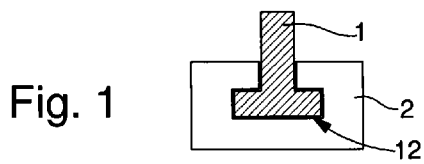
FIGS. 1 to 6 show schematically a first embodiment of the method according to the present invention.

In a first embodiment, first part 1 and second part 2 are assembled in a moveable manner to form a unit 3. For example, it is possible to imagine that unit 3 is a ball joint or a wheel rotatably mounted on an arbour. It is also possible to imagine two tubes mounted loosely in relation to each other. This unit includes a support 2 which is the second part, to which a first moveable part 1 is secured, which is the first part as seen in FIG. 1.

Advantageously according to the invention, the thermal expansion coefficients $\alpha_1$ et $\alpha_2$ of first part 1 and second part 2 are different. This causes the mobility of the first part 1 relative to second part 2. It is the difference between the expansion coefficients which causes the appearance of play or clamping. The use of an at least partially amorphous material comprising at least one metallic element cleverly makes it possible to simultaneously perform the operation of manufacturing the part, which made of at least partially amorphous material comprising at least one metallic element, with the operation of assembling said part to another part.

The play between the two moveable parts is defined by the difference in the thermal expansion coefficients of the first and second materials, by the temperature at which hot forming is performed and by the dimensions of first part 1 and second part 2. In the case of a moveable assembly, i.e. with the presence of a play 12 between the two parts 1, 2, the thermal expansion coefficient $\alpha_1$ is higher than thermal expansion coefficient $\alpha_2$. The greater the thermal expansion coefficient $\alpha_1$ compared to thermal expansion coefficient $\alpha_2$, the greater play 12 will be. Indeed, since first part 1 is confined in second part 2, this first part 1 must contract more than second part 2. To achieve this, the product of said thermal expansion coefficient $\alpha_2$ and said cooling gradient must be less than the product of said thermal expansion coefficient $\alpha 1$ and said cooling gradient.

Likewise, the higher the hot forming temperature, the larger the play will be at ambient temperature. It is also possible to modify the final play 12 of the assembly by applying greater or less stress during cooling up to at least Tg.

The use of amorphous metal then allows first part 1 to be manufactured at the same time as the moveable assembly without making the method more complicated but, on the contrary, by simplifying it.

The surplus material may be removed for example by a chemical or mechanical process. The surplus can be removed prior to or after cooling.

In an alternative, the second part 2 will be made of amorphous metal or metal alloy whereas the first part 1 will be made of any material. Second part 2, which is the support, includes a housing 6 in which the first part 1 is housed. The method used is the hot forming method described above.

In a first variant seen in FIGS. 12 to 18, an additional step may be provided between the first and second step. This additional step consists in depositing an intermediate layer 9 on the part which is not made of amorphous metal, i.e. on the walls 7 of housing 6 of second part 2 here when the first part is cast in said housing 6 or on the walls 7 of first part 1 in the case of the alternative to said first embodiment. This intermediate layer 9 can be deposited by CVD, PVD, electrodeposition, galvanic deposition or other means. After the third step, this layer 9 is thus inserted between the first part 1 and second part 2. This intermediate layer 9 can then be selectively dissolved in a chemical bath in order to increase the play 12 between said first part 1 and second part 2. Dissolution is possible since a play 12 is previously created between first part 1 and second part 2 allowing the chemical solution to infiltrate and thus remove all of intermediate layer 9.

Figure 7:
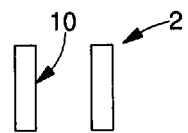
FIGS. 7 to 11 show schematically a second embodiment of the method according to the present invention.

In a second embodiment, first part 1 and second part 2 are fixedly assembled to form a unit. The ability of the amorphous metal to perfectly adopt all the details of a surface during hot working can also be used to seal an assembly if the difference in expansion coefficients of the materials used for parts 1 and 2 is properly chosen. For example, it could be imagined that this unit 3 is a sealed assembly of two tubes or of a watch hand secured to its arbour. This unit includes a support 2, which is second part 2, to which a first moveable part 1 is secured, which is the first part as seen in FIG. 7. The method used is the same as the method used in the first embodiment which is shown in FIGS. 8 to 11. This method uses hot forming and as for the first embodiment, first part 1 or second part 2 may be made of amorphous metal or an amorphous metal alloy.

In this embodiment, the sealed assembly or clamping of a second part confining a first part is achieved by the selecting the first and second materials so that thermal expansion coefficient $\alpha_1$ is lower than thermal expansion coefficient $\alpha_2$. More specifically, the dimensions of the first and second parts and the thermal expansion coefficients $\alpha_1$ and $\alpha_2$ are determined so that the product of said thermal expansion coefficient $\alpha_2$ and said cooling gradient is higher than the product of said thermal expansion coefficient $\alpha_1$ and said cooling gradient. The second part which confines the first part thus contracts more than the first part thereby clamping said first part.

Consequently, during cooling of the first and second parts, the first and second materials contract. Since the thermal expansion coefficients are different, the contractions are different. In the present case, the second material will contract more than the first material, thereby clamping the second part 2 onto the first part 1. The clamping force is thus defined by the difference in the thermal expansion coefficients of the first and second materials and by the temperature at which the hot forming is performed and the dimensions of the parts. The higher the thermal expansion coefficient $\alpha_2$ compared to thermal expansion coefficient $\alpha_1$, the greater the clamping force will be. Likewise, the higher the hot forming temperature, the greater the clamping force will be at ambient temperature. It is also possible to modify the final clamping force of the assembly by applying greater or less stress during cooling up to at least Tg.

Figure 19:
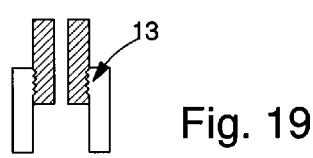
FIG. 19 shows schematically a variant of the second embodiment of the method according to the present invention.

In a variant of this second embodiment seen in FIG. 19, an additional step may be provided between the first and second step. This additional step consists in machining the internal walls 10 of the second part 2 when the first part is made of amorphous material or in machining the external walls 11 of first part 1 when the second part is made of amorphous material. This machining consists in machining rough areas such as portions in relief 13. During hot forming, this improves the mechanical adhesion and/or sealing between first part 1 and second part 2.

A variant must also be mentioned where an intermediate layer is added between part 1 and part 2. This layer allows the clamping forces to be adjusted within a larger range by selecting a material having a different expansion coefficient from parts 1 and 2 for said layer.

In a variant, it is also possible to use this layer for security, in order to avoid breaking the part to be assembled to the amorphous metal, particularly in the case of the assembly of a fragile material, such as silicon for example. A soft layer (copper, gold, silver, indium, etc.), which, when the assembly is stressed due to cooling, will deform plastically before the fragile material breaks can therefore be deposited on the fragile material.

In another variant, the first part 1 or second part 2 could be heated locally to expand locally the material of first part 1 or second part 2. This then allows the first and second parts to be assembled to each other. Preferably, this variant will be used in the second embodiment.

It will be clear that various alterations and/or improvements and/or combinations evident to those skilled in the art may be made to the various embodiments of the invention set out above without departing from the scope of the invention defined by the annexed claims.

The invention claimed is:

1. A method of permanent assembly between at least a first part, formed of a first material, and at least a second part, which is formed of a second material, and which is configured to confine said first part in said permanent assembly, the method comprising:
    selecting as the first material a metal alloy capable of becoming at least partially amorphous, the second material not being a metal alloy capable of becoming at least partially amorphous;
    taking the part formed of said second material;
    shaping the first part and simultaneously assembling said first part to the second part, with said first material having undergone, at a latest at a moment of said shaping, a treatment allowing said material to become at least partially amorphous, the first part and the second part undergoing a thermal cycle including an increase in temperature gradient to ensure at least expansion of the second part followed by a cooling gradient for shrinking the second part around the first part so as to confine said first part;
    sizing said at least one second part and said at least one first part, and choosing the thermal expansion coefficient of said second material compared to the thermal expansion coefficient of said first material, in order, as appropriate;
    obtaining a permanent assembly with said second part clamped over said first part if the product of said thermal expansion coefficient of said second material and said cooling gradient is higher than the product of said thermal expansion coefficient of said first material and said cooling gradient;
    obtaining a permanent assembly with at least a degree of freedom between said second part and said first part if the product of said thermal expansion coefficient of said second material and said cooling gradient is lower than the product of said thermal expansion coefficient of said first material and said cooling gradient.

2. The permanent assembly method according to claim 1, further comprising:

defining said thermal cycle such that said increase in temperature gradient raises the first material, selected to be a metal alloy capable of becoming at least partially amorphous, above the melting temperature causing said material to lose, at least locally, any crystalline structure, and such that said cooling gradient brings the first material below the vitreous transition temperature thereof, allowing said first material to become at least partially amorphous.

3. The assembly method according to claim 2, further comprising depositing an intermediate layer on the second part, and a final dissolving said intermediate layer to increase play between the first and second parts if the product of said thermal expansion coefficient of said second material and said cooling gradient is less than the product of said thermal expansion coefficient of said first material and said cooling gradient.

4. The permanent assembly method according to claim 1, wherein the shaping includes:
   transforming the first material into a preform and subjecting said first material to a treatment which allows said first material to become at least partially amorphous;
   defining said thermal cycle of said first material transformed into a preform such that the preform is subject to a temperature between a vitreous transition temperature and a crystallisation temperature thereof;
   pressing said preform such that said at least one second part confines said at least one first part;
   cooling the assembly to allow said first material to keep an at least partially amorphous nature.

5. The assembly method according to claim 4, further comprising depositing an intermediate layer on the second part, and a final dissolving said intermediate layer to increase play between the first and second parts if the product of said thermal expansion coefficient of said second material and said cooling gradient is less than the product of said thermal expansion coefficient of said first material and said cooling gradient.

6. The assembly method according to claim 4, further comprising making at least one portion in relief on the second part to increase mechanical adhesion between the first and the second parts.

7. The assembly method according to claim 6, wherein said at least one portion in relief is achieved by machining.

8. The assembly method according to claim 1, further comprising depositing an intermediate layer on the second part, and a final dissolving said intermediate layer to increase play between the first and second parts if the product of said thermal expansion coefficient of said second material and said cooling gradient is less than the product of said thermal expansion coefficient of said first material and said cooling gradient.

9. The assembly method according to claim 1, wherein said first material chosen as being a metal alloy capable of becoming at least partially amorphous undergoes a treatment allowing said second material to become totally amorphous.

10. The assembly method according to claim 1, wherein said first material chosen as being a metal alloy capable of becoming at least partially amorphous undergoes a thermal treatment allowing said first material to become at least partially crystalline after the assembly.

11. The method of permanent assembly between at least a first part, formed of a first material, and at least a second part, which is formed of a second material, and which is configured to confine said first part in said permanent assembly, the method comprising:

selecting as said second material a metal alloy capable of becoming at least partially amorphous, the first material not being a metal alloy capable of becoming at least partially amorphous;
taking the part formed of said first material;
shaping the second part and simultaneously assembling said second part to the first part, with said second material having undergone, at a latest at a moment of said shaping, a treatment allowing said second material to become at least partially amorphous, the second part and the first part undergoing a thermal cycle including an increase in temperature gradient to ensure at least expansion of the first part followed by a cooling gradient for shrinking the second part around the first part so as to confine said first part;
sizing said at least one second part and said at least one first part, and choosing the thermal expansion coefficient of said second material compared to the thermal expansion coefficient of said first material, in order, as appropriate;
obtaining a permanent assembly with said second part clamped over said first part if the product of said thermal expansion coefficient of said second material and said cooling gradient is higher than the product of said thermal expansion coefficient of said first material and said cooling gradient;
obtaining a permanent assembly with at least a degree of freedom between said second part and said first part if the product of said thermal expansion coefficient of said second material and said cooling gradient is lower than the product of said thermal expansion coefficient of said first material and said cooling gradient.

12. The permanent assembly method according to claim 11, further comprising:
   defining said thermal cycle such that said increase in temperature gradient raises the second material, selected to be a metal alloy capable of becoming at least partially amorphous, above the melting temperature causing said material to lose, at least locally, any crystalline structure, and such that said cooling gradient brings the second material below the vitreous transition temperature thereof, allowing said second material to become at least partially amorphous.

13. The assembly method according to claim 12, further comprising depositing an intermediate layer on the first part, and a final dissolving said intermediate layer to increase play between the first and second parts if the product of said thermal expansion coefficient of said second material and said cooling gradient is less than the product of said thermal expansion coefficient of said first material and said cooling gradient.

14. The permanent assembly method according to claim 11, wherein the shaping includes:
   transforming the second material into a preform and subjecting said second material to a treatment which allows said second material to become at least partially amorphous;
   defining said thermal cycle of said second material transformed into a preform such that the preform is subject to a temperature between a vitreous transition temperature and a crystallisation temperature thereof;
   pressing said preform such that said at least one second part confines said at least one first part;
   cooling the assembly to allow said second material to keep an at least partially amorphous nature.

15. The assembly method according to claim 14, further comprising depositing an intermediate layer on the first part, and a final dissolving said intermediate layer to increase play between the first and second parts if the product of said thermal expansion coefficient of said second material and said cooling gradient is less than the product of said thermal expansion coefficient of said first material and said cooling gradient.

16. The assembly method according to claim 14, further comprising making at least one portion in relief on the first part to increase mechanical adhesion between the first and second parts.

17. The assembly method according to claim 16, wherein said at least one portion in relief is achieved by machining.

18. The assembly method according to claim 11, further comprising depositing an intermediate layer on the first part, and a final dissolving said intermediate layer to increase play between the first and second parts if the product of said thermal expansion coefficient of said second material and said cooling gradient is less than the product of said thermal expansion coefficient of said first material and said cooling gradient.

19. The assembly method according to claim 11, wherein said second material chosen as being a metal alloy capable of becoming at least partially amorphous undergoes a treatment allowing said second material to become totally amorphous.

20. The assembly method according to claim 11, wherein said second material chosen as being a metal alloy capable of becoming at least partially amorphous undergoes a thermal treatment allowing said second material to become at least partially crystalline after the assembly.

\* \* \* \* \*